United States Patent [19]

Williams

[11] 4,374,943
[45] Feb. 22, 1983

[54] POLYSULFIDE ALKOXY SILANE COUPLING AGENTS

[75] Inventor: Thomas C. Williams, Ridgefield, Conn.

[73] Assignee: Union Carbide Corporation, Danbury, Conn.

[21] Appl. No.: 228,947

[22] Filed: Jan. 27, 1981

Related U.S. Application Data

[63] Continuation-in-part of Ser. No. 79,499, Sep. 27, 1979, abandoned.

[51] Int. Cl.$^3$ .............................................. C08K 9/12
[52] U.S. Cl. ................................... 523/211; 524/154; 525/340; 525/341
[58] Field of Search ............... 525/102, 340, 341, 342; 252/430; 523/210, 211; 524/154

[56] References Cited

U.S. PATENT DOCUMENTS

| | | | |
|---|---|---|---|
| 3,072,618 | 1/1963 | Triblak | 525/341 |
| 3,697,620 | 10/1972 | Ermidis | 525/340 |
| 3,752,787 | 8/1973 | de Brunner | 525/340 |
| 3,842,111 | 10/1974 | Simon et al. | 260/448.2 E |
| 3,873,489 | 3/1975 | Thurn et al. | 260/33.6 AQ |
| 3,962,179 | 6/1976 | Chen | 524/154 |
| 4,003,843 | 1/1977 | Kempermann et al. | 252/182 |
| 4,044,037 | 8/1977 | Mui et al. | 260/448.2 N |

*Primary Examiner*—Paul R. Michl
*Attorney, Agent, or Firm*—Paul W. Leuzzi, II

[57] ABSTRACT

The coupling action of polysulfide alkoxy silanes in rubbers is enhanced by the utilization of triorganophosphine compositions.

7 Claims, No Drawings

POLYSULFIDE ALKOXY SILANE COUPLING AGENTS

CROSS-REFERENCE TO RELATED APPLICATION

This is a continuation-in-part of U.S. patent application Ser. No. 079,499, which was filed on Sept. 27, 1979 and is now abandoned.

BACKGROUND OF THE INVENTION

1. Field of the Invention

This invention relates to sulfur vulcanizable elastomer composites which are based upon vulcanizable unsaturated polymers and copolymers such as natural rubbers, polyisoprenes, polybutadienes, poly(butadiene-co-styrene), poly(butadiene-co-acrylontrile), poly(isobutylene-co-butadiene, and the like. More particularly, this invention relates to means for enhancing the coupling action, in such sulfur vulcanizable elastomers, of polysulfide alkoxy silane coupling agents.

2. Description of the Prior Art

Polysulfide alkoxy silane coupling agents are known, and are described e.g. in U.S. Pat. Nos. 3,842,111, 3,873,489, 4,003,843, and 4,044,037. Polysulfide-functional organosilanes are, like mercapto-functional organosilanes, useful as coupling agents in silica-filled and silicate-filled sulfur vulcanizable elastomer composites. However, the polysulfide-functional organosilanes are, as compared to the mercapto-functional organosilanes, less active. Under comparable conditions, the former produce lesser improvements than do the latter in elastomer vulcanizate properties such as tensile modulus.

BRIEF SUMMARY OF THE INVENTION

It has now been found that triorganophosphines can be utilized to enhance the coupling action of polysulfide alkoxy silane coupling agents. More specifically, it has been found that compositions which contain triorganophosphine (preferably in admixture with water, lower alkanol, and porous inert inorganic solid carrier) can be utilized to enhance the coupling action of polysulfide alkoxy silane coupling agents in the preparation of vulcanizable rubber from formulations comprising a major proportion of vulcanizable unsaturated polymer or copolymer and a small amount of polysulfide alkoxy silane coupling agent. Also, it has been found that compositions which contain a polysulfide alkoxy silane coupling agent and a triorganophosphine, (preferably in admixture with water, lower alkanol, and porous inert inorganic solid) can be utilized in the vulcanization of sulfur-vulcanizable formulations containing a major proportion of vulcanizable unsaturated polymer or copolymer. The utilization of such compositions improves the elastomer vulcanizate properties as compared to the use of similar compositions without the triorganophosphine.

DESCRIPTION OF THE PREFERRED EMBODIMENTS

The sulfur-vulcanizable elastomer composites in which improved coupling action according to the present invention can be obtained are those based upon unsaturated polymers and copolymers such as natural rubbers, polyisoprenes, polybutadienes, (poly(butadiene-co-styrene), poly(butadiene-co-acrylonitrile), poly(isobutylene-co-butadiene), and the like. The preferred sulfur-vulcanizable elastomer composites are those based upon styrene-butadiene copolymers.

The polysulfide alkoxy silane coupling agents which can be employed according to the present invention are known as a class and are described, for example in U.S. Pat. Nos. 3,842,111, 3,873,489, 4,003,843, and 4,044,037. A preferred variety of these coupling agents is represented by the formula

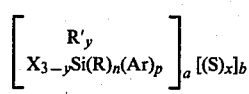

wherein X represents an alkoxy radical, R' represents an alkyl radical having up to four carbon atoms, y has a value of from 0 to 2 inclusive, R represents a divalent bridging group selected from the group consisting of alkylene and alkyleneoxy radicals having up to seven carbon atoms, n has a value of 0 or 1, p has a value of 0 or 1, Ar represents an aryl radical containing from 6 to 12 carbon atoms, $(S)_x$ represents a divalent polysulfide radical each free valence thereof being directly bonded to an aromatic carbon atom of an Ar radical whereby each Ar radical is bonded to another Ar radical through a $(S)_x$ radical, x has a value of from 2 to 6, a has a value of at least 2, b has a value of at least 1, and the ratio of a to b is a value of not more than 2. Illustrative of this preferred variety of coupling agents are the silanes having the formulae $[(CH_3O)_3Si(CH_2)_3]_2[S_x]$ wherein x has an average value of about 4, $[(CH_3O)_3Si(CH_2)_3]_2[S_2]$, and

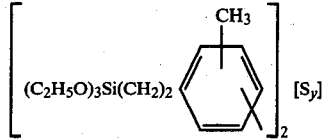

where y has an average value of about 3. The latter silane is most preferred.

The organophosphines which can be used according to the present invention are those of the formula $R^1R^2R^3P$, wherein each R represents an organo radical. The preferred organo radicals are alkyl radicals, especially those having up to eight carbon atoms. Exemplary organophosphines include trimethylphosphine, triethylphosphine, triisopropylphosphine, triheptylphosphine, etc. The most preferred organophosphine is tri-n-butylphosphine.

The organophosphine additive is conveniently utilized in the form of a dry concentrate. One approach is to stir the organophosphine and water in a low alkanol, e.g. methanol solvent for a few minutes at room temperature, and then to take up the liquid on a porous inert inorganic solid, e.g. calcium silicate, carrier to form a dry concentrate. The dry concentrate can then be added to sulfur-vulcanizable rubber formulations which contain polysulfide silane coupling agent. Another approach is to stir the polysulfide silane coupling agent as well as the organophosphine and water in a lower alkanol, e.g. methanol, solvent for a few minutes at room temperature, and again to take up the liquid on a porous inert inorganic solid, e.g. calcium silicate, carrier to form a dry concentrate. Said dry concentrate can then be added to sulfur-vulcanizable rubber formulations. It is believed that the water supplies protons which reduce the polysulfide linkages. The amount of water utilized will be that necessary to obtain the desired rubber curing rate.

EXAMPLES

The specific examples which follow are illustrative of the principles of the invention.

Elastomer Base: A typical elastomer base contains 100 parts by weight of SBR 1502, a styrene-butadiene copolymer (as described in "The Elastomers Manual", International Institute of Synthetic Rubber Producers, 1974 Edition, page 22), 50 parts by weight of precipitated high surface area silica, 8 parts by weight of aromatic hydrocarbon oil, 1.0 parts by weight of tetramethylthiuram monosulfide, 1.5 parts by weight of 2-mercaptobenzothiazole, 2.0 parts by weight of sulfur, 5.0 parts by weight of zinc oxide, 1.0 part by weight of stearic acid, and varying parts by weight of additives according to the present invention.

The elastomer base is processed as follows: The SBR 1502 is banded on a two-roll 6"×12" laboratory rubber mill at a roll temperature of 125° F. and is milled for one minute, dry concentrates according to the present invention are added and dispersed by further milling for about two minutes, half of the silica filler are added followed by the addition of the remaining half along with the aromatic hydrocarbon oil, and these components are dispersed by further milling for two to three minutes, at which time the remaining (vulcanizing) chemicals is added and dispersed; the mixture so-obtained is removed from the mill as a sheet and is press-vulcanized at 320° F. to form ASTM tensile test sheets. Physical tests of the vulcanizate were performed according to standard ASTM test methods.

Tensile Modulus: Evidence of action by a coupling agent in a composite is manifested through changes in composite physical property values away from the values displayed by the composite in the absence of the agent. Composite properties which may be favorably altered by coupling agent action are many and varied. For example, in elastomeric composites, the effects of coupling agents are seen in terms of increased tensile modulus and abrasion resistance and in decreased hysteresis losses in flexure. In highly extensible elastomeric composites, the measurement of changes in tensile modulus is a particularly useful way of observing coupling effects and has been used extensively in the experimental work described herein. Tensile modulus is defined here as the tensile stress in pounds per square inch of original cross-sectional area necessary to produce a selected extension in a composite specimen, usually 100%, 200%, or 300% of the unstressed length; these parameters are usually indicated as M100, M200, or M300, respectively.

EXAMPLE: SILANE/PHOSPHINE ADDITIVE

In this Example, additives compositions as indicated were added to the Elastomer Base described above (the values given are in parts per 100 parts SBR 1502):

| Additive | 1 | 2 | 3 | 4 |
|---|---|---|---|---|
| $\left[(C_2H_5O)_3Si(CH_2)_2\text{-}C_6H_3(CH_3)\right]_2[S\sim 3]$ | 0 | 1.5 | 1.5 | 1.5 |
| Tri-n-butylphosphine | 0 | 0 | 0 | 1.8 |
| Microporous Synthetic Calcium Silicate | 0 | 0 | 3.5 | 3.5 |
| Methanol | 0 | 0 | 3.0 | 3.0 |
| Water | 0 | 0 | 0.2 | 0.2 |

The ASTM test results were ("ppsi"=pounds per square inch):

| Vulcanizate | 1 | 2 | 3 | 4 |
|---|---|---|---|---|
| Hardness (Shore A) | 60 | 60 | 60 | 65 |
| M100 (ppsi) | 125 | 175 | 175 | 225 |
| M300 (ppsi) | 250 | 500 | 500 | 1000 |
| Tensile (ppsi) | 2200 | 3100 | 3000 | 2200 |
| Elongation (%) | 1000 | 800 | 800 | 500 |
| C Tear (ppsi) | 200 | 300 | 300 | 300 |

It is evident that the use of an organophosphine according to the present invention results in a significant and unexpected increase in the tensile moduli (e.g., M100 and M300) of vulcanizates embodying it.

EXAMPLE: PHOSPHINE ADDITIVE

In this Example, 1.5 parts per 100 parts SBR 1502 of a polysulfide silane coupling agent,

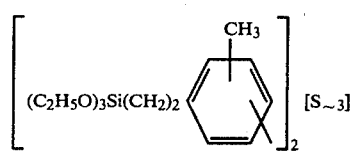

was added to the Elastomer Base described above (except in the Control Run, 1) prior to the addition of the indicated amounts of the other additives (the values given are in parts per 100 parts SBR 1502):

| Additive | 1 | 2 | 3 | 4 | 5 | 6 | 7 |
|---|---|---|---|---|---|---|---|
| Tri-n-butylphosphine | 0 | 0 | 0.4 | 0.8 | 1.2 | 1.6 | 2.0 |
| Microporus Synthetic Calcium Silicate | 0 | 0 | 0.4 | 0.8 | 1.2 | 1.6 | 2.0 |
| Methanol | 0 | 0 | 0.38 | 0.76 | 1.14 | 1.52 | 1.90 |
| Water | 0 | 0 | 0.01 | 0.04 | 0.06 | 0.08 | 0.10 |

The ASTM test results were ("ppsi"=pounds per square inch):

| Vulcanizate | 1 | 2 | 3 | 4 | 5 | 6 | 7 |
|---|---|---|---|---|---|---|---|
| Hardness (Shore A) | 60 | 65 | 65 | 65 | 65 | 65 | 70 |
| M100 (ppsi) | 125 | 200 | 225 | 225 | 250 | 275 | 275 |
| M300 (ppsi) | 250 | 600 | 700 | 800 | 950 | 900 | 900 |
| Tensile (ppsi) | 2200 | 2900 | 2700 | 2500 | 2400 | 2200 | 2200 |
| Elongation (%) | 1000 | 700 | 650 | 600 | 550 | 550 | 550 |
| C Tear (ppsi) | 200 | 300 | 300 | 300 | 300 | 300 | 300 |

It is again evident that the use of an organophosphine according to the present invention results in a significant increase in the tensile moduli (e.g., M100 and M300) of vulcanizates embodying it.

Various modifications and variations of these illustrative Examples will be obvious to those workers skilled in the art. Such modifications and variations are included with the purview of this invention and are encompassed by the scope and spirit of the appended claims.

What is claimed is:

1. A dry concentrate which comprises (I) a triorganophosphine of the formula $R^1R^2R^3P$, wherein each of $R^1$, $R^2$, and $R^3$ represents an alkyl radical having up to eight carbon atoms, (II) water, (III) lower alkanol, and (IV) porous inert inorganic solid.

2. A dry concentrate which comprises (I) a polysulfide alkoxysilane coupling agent of the formula

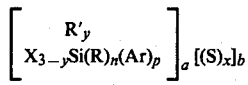

wherein X represents an alkoxy radical, R' represents an alkyl radical having up to four carbon atoms, y has a value of from 0 to 2 inclusive, R represents a divalent bridging group selected from the group consisting of alkylene and alkyleneoxy radicals having up to seven carbon atoms, n has a value of 0 or 1, p has a value of 0 or 1, Ar represents an aryl radical containing from 6 to 12 carbon atoms, $(S)_x$ represents a divalent polysulfide radical each free valence thereof being directly bonded to an aromatic carbon atom of an Ar radical whereby each Ar radical is bonded to another Ar radical through a $(S)_x$ radical, x has a value of from 2 to 6, a has a value of at least 2, b has a value of at least 1, and the ratio of a to b is a value of not more than 2, (II) a triorganophosphine of the formula $R^1R^2R^3P$, wherein each of $R^1$, $R^2$, and $R^3$ represents an alkyl radical having up to eight carbon atoms, (III) water, (IV) lower alkanol, and (V) porous inert inorganic solid.

3. A composition as in claim 2 wherein the polysulfide silane coupling agent is that of the formula

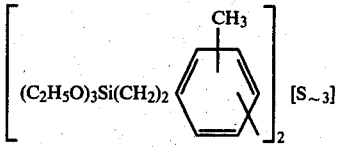

4. A composition as in claim 1 or 2 in which the triorganophosphine is that of the formula

5. A sulphur vulcanizable formulation which comprises a major proportion of vulcanizable unsaturated polymer or copolymer selected from the group consisting of natural rubbers, polyisoprenes, polybutadienes, poly(isobutylene-co-butadiene), poly(butadiene-co-acrylonitrile) and poly(butadiene-co-styrene) and which contains a composition as in claim 1 or 2.

6. A process for preparing a vulcanized rubber which comprises vulcanizing the formulation of claim 5.

7. The product of the process of claim 6.